United States Patent
Gaston

(10) Patent No.: US 6,609,203 B1
(45) Date of Patent: Aug. 19, 2003

(54) SECURE OPTICALLY READABLE MEMORY USABLE IN CONNECTION WITH A LIMITED NUMBER OF MACHINES

(75) Inventor: Kerry R. Gaston, Montgomery, AL (US)

(73) Assignee: Global Anti-Piracy Systems, Inc., Montgomery, AL (US)

( * ) Notice: Subject to any disclaimer, the term of this patent is extended or adjusted under 35 U.S.C. 154(b) by 0 days.

(21) Appl. No.: 09/190,511

(22) Filed: Nov. 12, 1998

(51) Int. Cl.[7] .................................................. H04L 9/00
(52) U.S. Cl. ........................ 713/193; 713/183; 380/201; 705/57; 369/60
(58) Field of Search .............................. 713/183, 193; 380/201–203; 705/57, 52; 369/60

(56) References Cited

U.S. PATENT DOCUMENTS

| | | | | |
|---|---|---|---|---|
| 5,371,792 A | * | 12/1994 | Asai et al. ....................... 380/3 |
| 5,596,639 A | * | 1/1997 | Kikinis ........................... 380/4 |
| 5,604,002 A | * | 2/1997 | Tsujioka et al. ............. 428/641 |
| 5,646,993 A | * | 7/1997 | Aizawa ........................... 380/4 |
| 5,754,649 A | * | 5/1998 | Ryan et al. ..................... 380/4 |
| 5,963,536 A | * | 10/1999 | Vasic et al. .............. 369/275.3 |

* cited by examiner

*Primary Examiner*—Gilberto Barrón
*Assistant Examiner*—Paul E. Callahan
(74) *Attorney, Agent, or Firm*—Leydig, Voit & Mayer, Ltd.

(57) ABSTRACT

Digital information stored on a CD-ROM is accessible by use of a password, which is readable initially on the CD-ROM and which subsequently becomes at least partially unreadable due to exposure of the CD-ROM to the radiation used to read the CD-ROM. A user machine which read the password before the password became at least partially unreadable may subsequently use it to access encrypted information on the CD-ROM, while a user machine which has not read the password before it became at least partially unreadable will be unable subsequently to read the password, and hence unable to access encrypted information on the CD-ROM.

11 Claims, 3 Drawing Sheets

SECURE OPTICALLY READABLE MEMORY USABLE IN CONNECTION WITH A LIMITED NUMBER OF MACHINES

FIELD OF THE INVENTION

The present invention relates generally to the field of optically readable memory, and more particularly, relates to an optically readable memory that can be made secure and usable in connection with a limited number of machines.

BACKGROUND OF THE INVENTION

CD-ROM discs are capable of storing large quantities of digital information. This information may be program, database, image, music, video, desk top publishing, or other information susceptible to digital storage. The information is stored by physical pits situated along a spiral track which is several miles long. The physical pits may be made optically or physically, but are readable only optically. That a memory is optically readable means herein that the memory is readable through the use of a laser or other light source.

There are generally two alternate methods which may be used to manufacture CD-ROM's with specific information on them. The first of these is "glass mastering", which begins with creation of a first copy of the disc which will be used to create a series of positive and negative copies, which will then be used to press identical copies of the first disc. This method, with possibly only a few exceptions, does not allow for the placement of unique information on any one copy. "CD-R" is an alternative-writing process, wherein a layer of organic dye allows the CD-R disc to have a unique set of data recorded on it by a CD-R recorder. Copies made by the CD-R method need not be identical. Rather, each may contain certain unique information. Whichever method is used, each copy of the disc is generally coated with a reflective coating and a clear protective layer after being encoded with information.

In FIG. 1, there is shown a sectional side view of a prior art disc, taken along a radius of the disc. The data on the disc is represented by the structure 2 imprinted on the disc. As mentioned, the structure 2 representing the data is generally covered by a clear protective coating 4, after being covered by a thin reflective layer which is not depicted in the figures for simplicity. Generally, the information stored on a CD-ROM is read by directing a low-power laser (typically solid-state or HeNe) at the portion of the spiral track containing the information to be read, along the direction 6. Because the pits reflect light differently than the plains or lands between pits, a photodiode or other photosensitive receiver 8 exposed to the reflected light will detect a series of light and dark reflections as the disc spins, which can be converted to a series of 1's and 0's. These 1's and 0's are a digital representation of the information stored on the disc. Generally, to ensure that the pits and lands pass the laser and receptor 8 at the same rate regardless of location, the disc turns at a lower angular velocity as sectors farther from the center are read.

As a high density storage medium, CD-ROM technology involves the use of channel codes to retrieve the information stored on the disc. Typically, the channel code used is eight-to-fourteen modulation, a method which relies on transitions to signal ones, and the absence of transitions to signal zeros. Because of this high density and resulting high storage capacity, CD-ROM technology has emerged as a superior alternative to floppy disc technology for marketing large application programs or other memory intensive data.

Furthermore, the fact that they are an optical rather than magnetic medium makes CD-ROM's impervious to influences that would corrupt a floppy disc. Even the laser which is typically used by a user machine to read a CD-ROM disc is incapable of damaging or writing on the disc. Hence the moniker, ROM or Read Only Memory.

In the past, the inability of user machines to write on CD-ROM's has caused CD-ROM's to be difficult to secure. Once one user had acquired a disc, there was no way to avoid the dissemination of the information on the disc to other users. In light of this problem with CD-ROM's, certain security measures have developed. In one prior art scheme, a CD-ROM is packaged with a companion floppy disc, which is magnetically readable and writeable by the user computer, to be used along with the CD-ROM to access the information on the CD-ROM. The floppy, which contains information necessary to the use of the CD, is copy-protected. However, the security provided by this scheme is compromised by the widespread availability of means to defeat copy protection on floppy discs.

Methods of copy-protecting a CD itself include the method and apparatus claimed by Kikinis as disclosed in U.S. Pat. No. 5,596,639. The invention of Kikinis involves the use of a high-powered laser to damage the physical structure of the disc, in selected areas, to create a password. Drawbacks to this method are readily apparent; the programming of the password onto the disc requires a higher power laser than that used by the user computer. Thus there is no way, using this method, for the information on the disc to reflect whether a disc has been used already. Consequently, although the disc may be copy-protected, it is not protected from use by more than one user computer.

To overcome the drawbacks evident in the prior art, it is desirable to provide a CD-ROM disc which is capable of changing in response to an authorized use in order to block subsequent unauthorized use. To this end, the optically readable memory of the present invention is adapted to be permanently altered by a finite number of read cycles, so that a vanishing code located on the disc, usable to access the disc, becomes unreadable.

SUMMARY OF THE INVENTION

An object of the present invention is to provide an optically readable memory which is usable in connection with a finite number of user machines. Generally, this object is achieved by providing the optically readable memory with a vanishing code, usable to access information stored on the memory. The vanishing code is digitally written on the optically readable memory and is situated physically adjacent or proximal to an initially translucent mask layer. The mask layer is adapted to cause the vanishing code to become unreadable after at least one and possibly multiple readings by a user machine. In this manner, a user machine which has not already read the vanishing code will be unable to access the information stored on the disc after the vanishing code becomes unreadable.

The optically readable memory is preferably a CD-ROM, and the mask layer is preferably sensitive to low-power laser radiation such as that emitted by a solid-state or HeNe laser of the wavelength typically used by a user machine to read CD-ROM's. The mask layer is preferably a thin film or substrate positioned on the CD-ROM above the pits and lands representative of the vanishing code, but beneath the standard clear protective layer. The mask layer preferably becomes permanently altered to render the vanishing code unreadable after a finite number of exposures to the radiation used to read the disc.

In a preferred embodiment, the CD-ROM contains a vanishing code situated at least partially beneath a mask layer, usable to access the information stored on the CD-ROM; a gatekeeper program for locating, storing, and using the vanishing code; the hidden code; and the information on the disc to which access is sought.

DETAILED DESCRIPTION OF THE PREFERRED EMBODIMENTS

Figure 1:
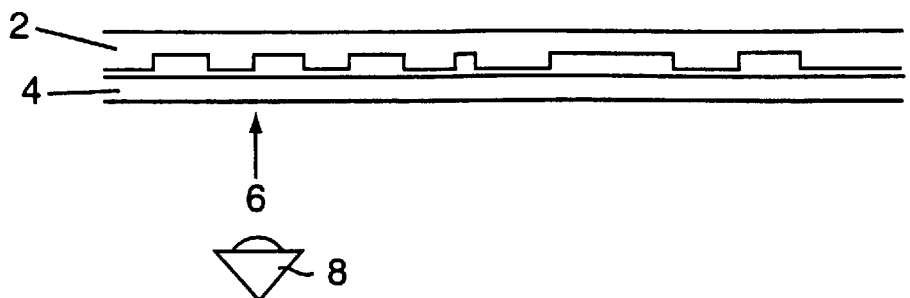
FIG. 1 is a sectional side view of a prior art disc, taken along a radius of the disc.
Figure 2:
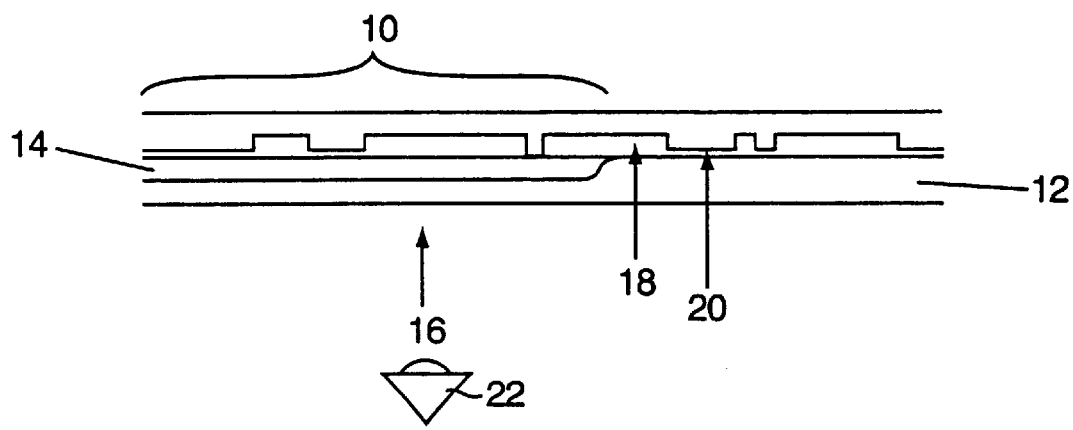
FIG. 2 is a sectional side view of the vanishing code portion of a disc according to the present invention, taken along a radius of the disc, wherein the disc has not yet been read by a user machine.

Turning to the figures, wherein like numerals designate like parts, there is shown in FIG. 2 a cross-sectional view of the vanishing code portion of a CD-ROM according to an embodiment of the invention, prior to use. In particular, the CD-ROM includes structure which represents digital data corresponding to a vanishing code 10, a standard clear protective coating 12, and a mask layer 14 disposed beneath the clear protective coating 12. The mask layer 14 may cover the entire vanishing code, or may cover only a portion of the vanishing code. The structure which represents the information and data on the disc may be disposed along a spiral track on the disc, as in the prior art. The vanishing code may be unique to the disc or, preferably, it may be the same for all copies of the same-titled CD-ROM. The laser radiation employed by the user machine's CD-ROM drive to read the disc is directed along line 16. During scanning of the vanishing code region, the laser radiation is transmitted through both the clear protective coating 12 and the mask layer 14, which is transparent prior to use. Upon striking a pit 18, the laser radiation reflects differently than upon striking a land 20. A photodiode or other photosensitive receiver 22 situated to receive reflected laser radiation detects the relative strength of reflected light. Upon further processing, the detected series of strong and weak reflections is converted to a digital series of 1's and 0's, representing the vanishing code. In this manner, the user machine may read and store the vanishing code when first presented with a new disc embodying the present invention. As will be described hereinafter, the vanishing code is preferably usable by the user machine to access the information stored on the CD-ROM. Possibly, the vanishing code is used in conjunction with a hidden code, much as a key is used in conjunction with a lock, to gain access to whatever application or data is stored on the CD-ROM.

Figure 3:
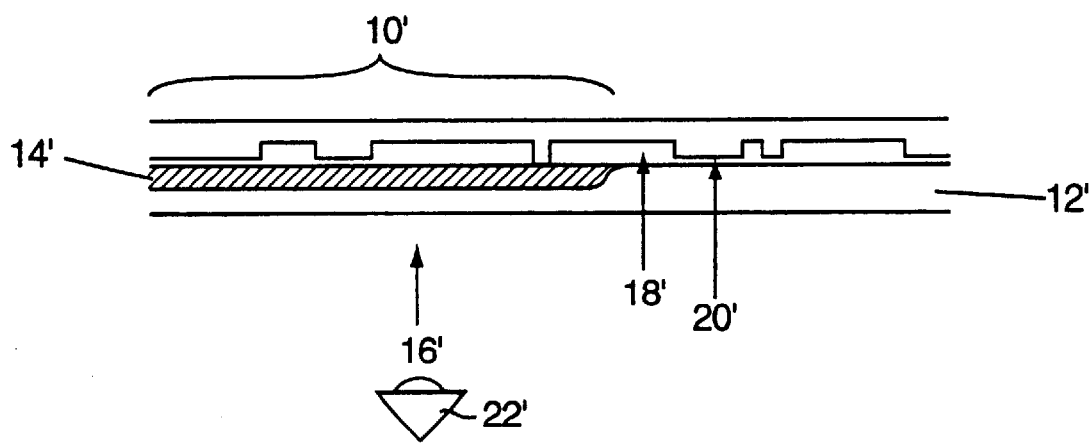
FIG. 3 is a sectional side view of the vanishing code portion of a disc according to the present invention, taken along a radius of the disc, wherein the disc has been previously read by a user machine.

Depicted in FIG. 3 is a cross-sectional view of the vanishing code portion of a CD-ROM according to an embodiment of the invention, after a finite number of scans by the reading laser of the user machine CD-ROM drive. Unlike the mask layer 14 in FIG. 2, the mask layer 14' in FIG. 3 is opaque. This is due to the light-sensitive nature of the mask layer material, which is particularly adapted in this embodiment to become opaque in response to a finite amount of exposure to the wavelength range of light typically used to read CD-ROM's. When the user machine attempts to read the vanishing code of the CD-ROM in FIG. 3, which code has become obscured by the now opaque mask layer 14', the laser radiation 16' used by the CD-ROM drive of the user machine does not reflect strongly from the structure 10' which represents the vanishing code. Thus, the vanishing code becomes unreadable, and the information stored in the vanishing code region of the CD-ROM is preferably interpreted as an invalid code. As will be described, a user machine which has not acquired the vanishing code before it has become unreadable will preferably not be able to access the data stored on the CD-ROM of FIG. 3.

Alternatively, the mask layer 14' material may become reflective upon repeated exposure to optical radiation. In this case, when the user machine attempts to read the vanishing code of the CD-ROM in FIG. 3, which code has become obscured by the now reflective mask layer 14', the laser radiation 16' used by the CD-ROM drive of the user machine reflects from the vanishing code region of the CD-ROM. Thus, the vanishing code becomes unreadable, and the information stored in the vanishing code region of the CD-ROM is preferably interpreted as an invalid code.

Figure 4:
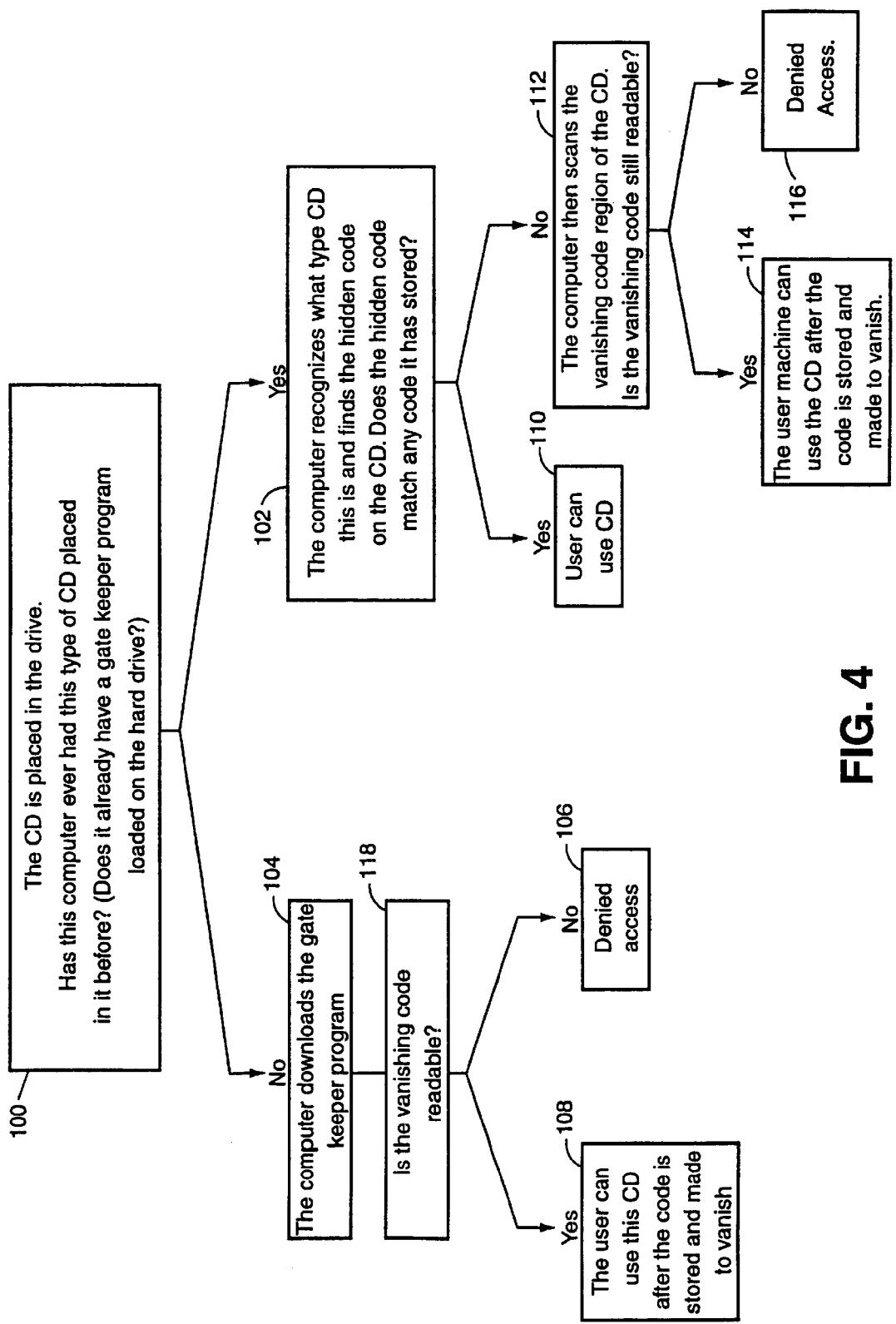
FIG. 4 depicts a flow chart representing the process used to grant or deny access to the information stored on a CD-ROM of the type of the present invention in one preferred embodiment.

There is shown in FIG. 4 a flowchart of the method according to a preferred embodiment whereby the user machine gains, or is denied, access to the information stored on an optically readable memory. At event 100, the CD-ROM is inserted into the drive of a computer. If the computer has previously used this type of disc, it will have loaded the gatekeeper program from the CD-ROM onto its hard drive. This is because the CD-ROM causes a computer which does not have the gatekeeper program on its hard drive to have the gatekeeper program installed. Thus, if there is no gatekeeper program on the hard drive, then the computer is instructed to load the freely accessible gatekeeper program onto its hard drive from the CD-ROM at event 104.

Once the gatekeeper program is installed and running, it functions to locate the vanishing code region of the CD-ROM and attempts to read the code, event 118. If the code is unreadable, then the gatekeeper program denies the computer access to the encrypted information on the CD-ROM, event 106. If the code is readable, the computer reads and stores it, using it thereafter to gain access to the encrypted information on the CD-ROM, event 108. As described previously, the process of reading the code will render the code unreadable after a finite number of scans by the user machine laser.

If the machine has previously been exposed to this type of disc as evidenced by the initial presence of the gatekeeper program on the hard drive, then the machine, using the gatekeeper program, locates the hidden code on the CD-ROM and compares it to vanishing codes that have previously been stored on the hard drive, event 102. If a match is found, the computer is granted access to the encrypted information on the disc, event 110. If a match is not found, the computer attempts to read the vanishing code, event 112. If the code is not readable, access is denied, event 116. If the code is readable, the computer reads it, permanently stores it in a location used for other codes usable in conjunction with this type of disc, and uses it to access the encrypted information on the disc, event 114. The process of reading the code will render it unreadable after at least one read.

It may often be useful to use the same hidden and vanishing codes for all copies of the same titled disc. In this manner, a user who has previously bought a copy of that disc and used it in their user machine may also use any other copy of the same disc. This would be true even where the other copy has previously been used by another machine rendering the vanishing code unreadable, because the user machine seeking access has already stored the hidden code during use of the first copy of the same titled disc.

Figure 5:
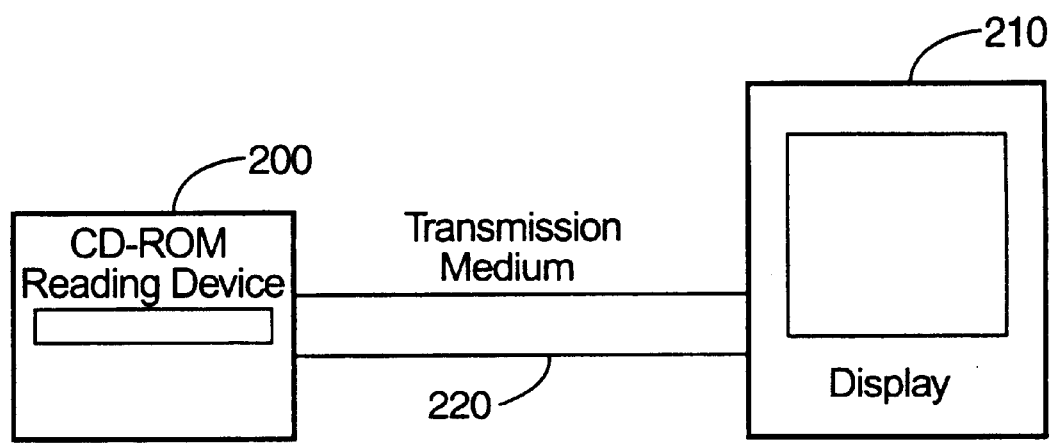
FIG. 5 depicts a system in which the memory of the present invention may be used, according to one embodiment.

In one preferred embodiment, the information protected on the CD-ROM is text information, such as the text of a novel, treatise, or periodical. In this embodiment, the CD-ROM is adapted to be used in a device which can read the information and display it or otherwise convey it to the user, once access to the disc is granted. FIG. 5 depicts a variation of this embodiment in which the device 200 which reads the CD-ROM may be physically separate from the means 210 for displaying or otherwise conveying the information read. In this variation, necessary information could be exchanged between the reading means and displaying or conveying means by way of permanent or temporary hardwire, optical, radio transmission, or other means 220. Such information may be, for example, display, control, or formatting information.

In another preferred embodiment, the gatekeeper program is the same regardless of the contents of the disc.

While the invention has been described with reference to certain exemplary embodiments, there is no intent to limit it to those embodiments. To the contrary, it is recognized that various changes and modifications to the specifically described embodiments will be apparent to those skilled in the art, and that such changes may be made without departing from the spirit and scope of the invention.

For example, the photosensitive mask layer which obscures the vanishing code may react indirectly to the heat caused by laser radiation rather than directly to the photons or light energy itself. Alternatively, the material that the code itself is written upon, rather than a mask layer, may become obscured or unreadable by laser radiation, energy, or heat. As well, the invention may be embodied in optically readable memory technology other than CD-ROM's. Examples of such other technology include the digital video disc (DVD), Laser Disc, CD-R, and minidisc, and there will likely be developed other optically readable memory systems with which the present invention could be used. It is also recognized that the invention may be used with optical memory technology which operates by transmittance rather than reflectance. It is thus not critical which side of the disc the mask layer is located upon, as this may be determined in part by the direction from which the optical radiation impinges upon the disc.

Further, there may be more than one vanishing code on a memory, or a vanishing code may be dispersed piecemeal at different locations on the memory. It is also within the scope of this invention to use a mask layer whose properties allow reading by some number of machines greater than one before the vanishing code becomes unreadable. Accordingly, such changes, modifications, and equivalents are intended to be covered by the appended claims and equivalents thereof.

What is claimed is:

1. A method of securely providing user information to a user machine adapted to operate in conjunction with an optically readable disc containing information which comprises at least the user information, a digitally written vanishing code, a hidden code, and a gatekeeper program, and having a mask layer deposited vertically adjacent to the vanishing code, wherein the mask layer is optically reactive to the wavelength of optical radiation usable to read the disc by the user machine to obscure the vanishing code after a finite amount of exposure to the wavelength of optical radiation usable to read the disc, such obscuration being a result of a permanent change in the value of the digitally written vanishing code to an invalid code, the method comprising the steps of:

causing the user machine to scan the optically readable disc and to install into the user machine memory the gatekeeper program if the gatekeeper program does not exist on the user machine memory, causing the user machine to use the gatekeeper program stored in the user machine memory to locate a region of the optically readable disc containing the vanishing code, causing the user machine to read the vanishing code and store the vanishing code on the user machine memory and granting the user machine access to the user information stored on the optically readable disc, if the vanishing code is readable, causing the user machine to search the user machine memory for a vanishing code that matches the hidden code if the vanishing code is at least partially unreadable, and granting the user machine access to the user information stored on the optically readable disc if such a vanishing code is found, and denying the user machine access to the user information stored on the optically readable disc if such a vanishing code is not found, whereby if the user machine has previously read the vanishing code it will have unlimited access to the user information recorded on the disc, while if the user machine has not previously read the vanishing code it will not have access to user information recorded on the disc.

2. The method according to claim 1, wherein a portion of information recorded on the disc is freely readable by the user machine, and provides information usable by the user machine to locate other information on the disc.

3. The method according to claim 1, wherein the disc is a CD-ROM disc.

4. The method according to claim 1, wherein the disc is a CD-R disc.

5. The method according to claim 1, wherein the disc is a minidisc.

6. The method according to claim 1, wherein the disc is a laser disc.

7. The method according to claim 1, wherein the disc is a DVD disc.

8. The method according to claim 1, wherein the user information, digitally written vanishing code, hidden code, and gatekeeper program are recorded on the disc by physical structure disposed along a spiral track.

9. The method according to claim 1, wherein the user information to be provided to the user machine is the text of a book.

10. The method according to claim 1, wherein the reading of the disc is performed in a device separate from the user machine, and the information so read is transmitted to the user machine.

11. The method according to claim 10, wherein the information read is transmitted to the user machine via at least one electrically conductive channel.

* * * * *